United States Patent
Singh et al.

(10) Patent No.: US 12,314,350 B1
(45) Date of Patent: May 27, 2025

(54) PAY-PER-USE METERING SERVICE FOR ELECTRONIC DESIGN AUTOMATION WORKLOADS IN THE CLOUD

(71) Applicant: Synopsys, Inc., Mountain View, CA (US)

(72) Inventors: Gurbir Singh, Hayward, CA (US); Rajendra Rao Kundapur, Santa Clara, CA (US); Jagadeeswara R. Mandla, San Jose, CA (US); Shekhar Y. Mahajan, Bangalore (IN)

(73) Assignee: Synopsys, Inc., Sunnyvale, CA (US)

( * ) Notice: Subject to any disclaimer, the term of this patent is extended or adjusted under 35 U.S.C. 154(b) by 300 days.

(21) Appl. No.: 18/060,464

(22) Filed: Nov. 30, 2022

Related U.S. Application Data

(60) Provisional application No. 63/324,974, filed on Mar. 29, 2022.

(51) Int. Cl.
  *G06F 21/10* (2013.01)
  *G06F 21/44* (2013.01)

(52) U.S. Cl.
  CPC ............ *G06F 21/105* (2013.01); *G06F 21/44* (2013.01)

(58) Field of Classification Search
  CPC .............................. G06F 21/105; G06F 21/44
  See application file for complete search history.

(56) References Cited

U.S. PATENT DOCUMENTS

| | | | |
|---|---|---|---|
| 2008/0195548 A1* | 8/2008 | Chu | G06F 21/10 705/1.1 |
| 2013/0262265 A1* | 10/2013 | Song | G06Q 20/127 726/28 |
| 2014/0189346 A1* | 7/2014 | Cureton | G06F 21/105 713/155 |
| 2016/0147550 A1* | 5/2016 | McWilliams | G06F 9/45558 718/1 |
| 2016/0381405 A1* | 12/2016 | Smith | H04N 21/8355 725/28 |
| 2017/0364885 A1* | 12/2017 | Fan | H04N 21/2541 |
| 2018/0314808 A1* | 11/2018 | Casey | H04W 4/02 |
| 2021/0073354 A1* | 3/2021 | Tyagi | G06F 11/3668 |
| 2021/0117514 A1* | 4/2021 | Kushtagi | H04L 9/3213 |
| 2022/0075888 A1* | 3/2022 | Kimura | G06F 21/121 |

* cited by examiner

*Primary Examiner* — Richard G Keehn
(74) *Attorney, Agent, or Firm* — Park, Vaughan, Fleming & Dowler LLP; Laxman Sahasrabuddhe

(57) ABSTRACT

A check-out request for a license may be received from an application, e.g., an electronic design automation (EDA) application, and may be routed to a license server. The license may be granted to the application, where granting the license to the application may include establishing a connection between the license server and the application. A check-in request may be received for the license from the application. The license may be revoked, which may include terminating the connection between the license server and the application. A usage amount may be determined based on information about the check-out request and information about the check-in request.

20 Claims, 7 Drawing Sheets

PAY-PER-USE METERING SERVICE FOR ELECTRONIC DESIGN AUTOMATION WORKLOADS IN THE CLOUD

RELATED APPLICATION

This application claims the benefit of U.S. Provisional Application Ser. No. 63/324,974, filed on 29 Mar. 2022, the contents of which are herein incorporated by reference in their entirety for all purposes.

TECHNICAL FIELD

The present disclosure relates to an electronic design automation (EDA) system. More specifically, the present disclosure relates to providing pay-per-use (PPU) metering service for EDA workloads in the cloud.

BACKGROUND

A license may need to be obtained to use a software application (or software tool). For example, EDA applications (or EDA tools) may be used for designing integrated circuits. Each EDA application may require one or more licenses to operate.

SUMMARY

Some embodiments described herein feature PPU metering service, e.g., for EDA workloads in the cloud. A check-out request for a license may be received from an application in a set of applications, where the set of applications may be a set of EDA applications that are hosted by a cloud computing service. Multiple applications may request check-outs at the same time. The check-out request for the license may be routed to a license server in a set of license servers. The license may be granted to the application, where granting the license to the application may include establishing a connection between the license server and the application. The connection may persist while the license is being used. Information about the check-out request may be stored in a storage. A check-in request may be received for the license from the application. The license may be revoked, which may include terminating the connection between the license server and the application. Information about the check-in request may be stored in the storage. A usage amount may be determined based on the stored information about the check-out request and the information about the check-in request. In some embodiments described herein, a usage report may be generated based on the usage amount.

In some embodiments described herein, available usage credits may be decreased based on the usage amount. In some embodiments described herein, the available usage credit may be compared with a first threshold, and a notification may be generated if the available usage credit is below the first threshold. In some embodiments described herein, the available usage credit may be compared with a second threshold, and an overage rate may be applied if the available usage credit is below the second threshold. In some embodiments described herein, the available usage credit may be compared with a third threshold, and the license server may be instructed to pause granting licenses if the available usage credit is below the third threshold. In some embodiments described herein, the license server may be instructed to resume granting licenses if the available usage credit increases above a fourth threshold.

In some embodiments described herein, a count of connections between the set of applications and the set of license servers may be monitored and compared with a fifth threshold. In response to determining that the count of connections is greater than the fifth threshold, an additional license server may be started and added to the set of license servers.

In some embodiments described herein, information about a request (check-out request or check-in request) received from an executing instance of an application may include one or more of: a type field, a job identifier corresponding to the executing instance of the application, a process identifier corresponding to the executing instance of the application, an Internet Protocol (IP) address corresponding to the requester, a feature identifier corresponding to the application, a project identifier corresponding to the executing instance of the application, a user identifier corresponding to the user that submitted the job which corresponds to the executing instance of the application, and a first timestamp corresponding to the request.

In some embodiments described herein, determining the usage amount based on the information about the check-out request and the information about the check-in request may include (1) correlating the check-out request with the check-in request based on the job identifier corresponding to the application, the process identifier corresponding to the application, the IP address corresponding to the application, the feature identifier corresponding to the application, the user identifier corresponding to the application, and (2) determining the usage amount based on a difference between the second timestamp (i.e., the check-in timestamp) and the first timestamp (i.e., the check-out timestamp).

In some embodiments described herein, the set of applications executes in a first set of cloud computing locations, and the set of license servers executes in a second set of cloud computing locations. A second cloud computing location in the second set of cloud computing locations may be selected that is geographically close to a first cloud computing location in the first set of cloud computing locations. Next, a secure connection may be established between the first cloud computing location and the second cloud computing location to route check-out and check-in requests.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

Aspects of the present disclosure relate to a pay-per-use metering service for electronic design automation workloads in the cloud.

In current approaches, an application (i.e., an EDA application or tool) and a license server may be installed in an enterprise network. An application may communicate with the license server to obtain licenses for one or more features used by the application. In this disclosure, depending on the context, the term "application" may refer to an application image that is stored on a storage device (e.g., disk) or executing on a processor.

Embodiments described herein generally apply to any client-server-based licensing system. For example, FLEXNet™ is a commonly used client-server-based license server. An application may establish a connection, e.g., a Transport Control Protocol (TCP)/IP connection, with a FLEXNet™ license server. The application may then send a check-out request for a license to the license server. The license server may determine if any licenses are available and may send a grant or denial response back to the application. If the application no longer requires the license, the application may return the license back to the license server by sending a check-in request to the license server, which may add the license back into the pool of available licenses.

In some approaches, a customer may buy a fixed number of licenses from a software vendor. The customer must manage the workload to ensure that the number of licenses used does not exceed the fixed number of licenses that were bought by the customer. Thus, the number of licenses that are bought by a customer may constrain the workloads that the customer may be able to run at any given time.

Customers desire to dynamically scale-up workloads on-demand. Customers are increasingly moving their workloads to the cloud, which provides on-demand availability of computer system resources to the customer. Current approaches for using licensed software applications are not suited for use in such scenarios. Specifically, the fixed number of licenses may prevent a customer from dynamically scaling-up workloads on-demand.

Technical advantages of embodiments described herein include, but are not limited to, (1) removing constraints imposed by licensing approaches that use a fixed number of licenses, (2) enabling licensed software to be used with an unlimited number of licenses, where the cost of using the licensed application is based on the amount of usage, and not based on the fixed number of licenses that were bought by a customer, and (3) implementing PPU metering without modifying licensed software or modifying the license server. Some embodiments described herein may obtain information about check-out and check-in events from the license server (which may be designed for implementing a fixed number of licenses) and may use this information to implement the PPU metering service.

Figure 1A:
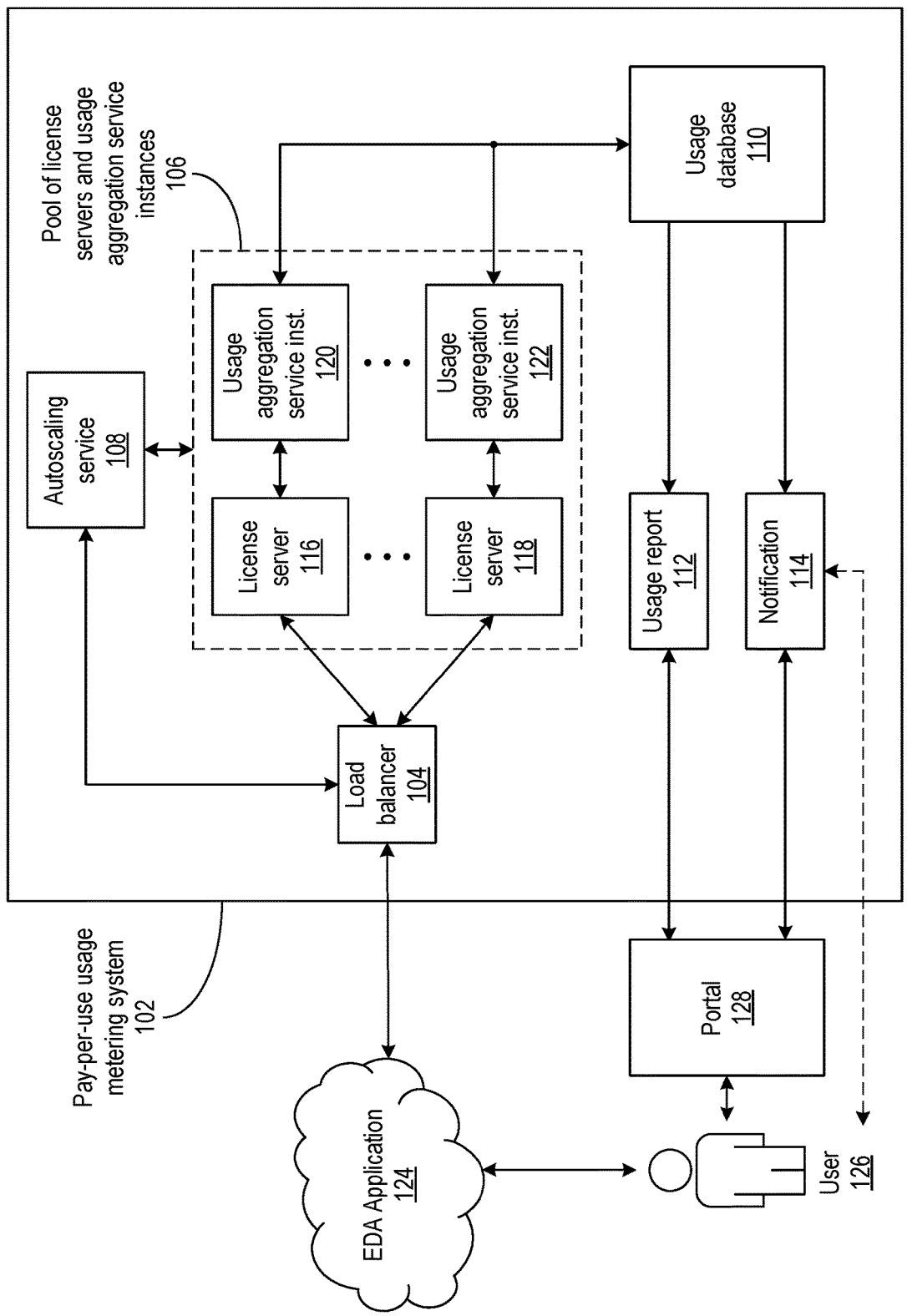
FIG. 1A illustrates a PPU metering system in accordance with some embodiments described herein.

FIG. 1A illustrates a PPU metering system in accordance with some embodiments described herein.

PPU metering system 102 may include load balancer 104, a pool of license servers and usage aggregation service instances 106, autoscaling service 108, usage database 110, usage report module 112, and notification module 114. Components of PPU metering system 102 (e.g., load balancer 104, a pool of license servers and usage aggregation service instances 106, autoscaling service 108, usage database 110, usage report module 112, and notification module 114) may be implemented by a processor executing instructions. Tasks that may be performed by load balancer 104 may include, but are not limited to, (1) routing check-out and check-in requests to license servers, (2) maintaining a count of concurrent connections between a set of applications and the set of license servers, and (3) managing the pool of license servers (e.g., adding and removing license servers from the pool). The pool of license servers and usage aggregation service instances 106 may include one or more license servers (e.g., license servers 116 through 118) and one or more usage aggregation service instances (e.g., usage aggregation service instances 120 through 122).

User 126 may use EDA application 124 which may be hosted on a cloud computing service, which may include, but is not limited to, Microsoft Azure™, Amazon Web Services™, and Google Cloud Platform™. When user 126 uses EDA application 124, EDA application 124 may send a check-out request for a license to PPU metering service 102. The check-out request may be routed by load balancer 104 to a license server (e.g., license server 116). The license server (e.g., license server 116) may grant the license to EDA application 124. EDA application 124 may not share any IC design data with PPU metering system 102. In other words, a customer may use PPU metering system 102 while keeping the IC design data designed using the EDA application 124 confidential. Granting the license to EDA application 124 may include establishing a connection between the license server (e.g., license server 116) and EDA application 124. The connection may persist while the license is being used. In other words, the connection may remain open until the license is checked-in. For example, the license server may be a client-server-based licensing system, e.g., a FLEXNet™ license server, and EDA application 124 may establish a connection (e.g., TCP/IP connection) with the license server through load balancer 104.

The license server (e.g., license server 116) may provide information about the check-out request to a usage aggregation service instance (e.g., usage aggregation service instance 120). For example, the license server may write information about the check-out request to a log file, and the usage aggregation service instance may read the log file. In some embodiments described herein, a one-to-one, many-to-one, and/or one-to-many correspondence may exist between license servers and usage aggregation service instances. For example, license server 116 may correspond to usage aggregation service instance 120, license server 118 may correspond to usage aggregation service instance 122, and so forth.

If EDA application 124 no longer requires the license (e.g., because EDA application 124 has completed the task for which the license was obtained), EDA application 124 may send a check-in request for the license to PPU metering service 102. The check-in request may be routed by load balancer 104 to the same license server that handled the check-out request for the license. For example, if license server 116 handled the check-out for the license, then the check-in request for the license may be routed to license server 116. The license server (e.g., license server 116) may then revoke the license. The term "revoke" may generally refer to an operation that prevents the license from being used by the application. The license server (e.g., license server 116) may provide information about the check-in request to a usage aggregation service instance (e.g., usage aggregation service instance 120). For example, the license server may write information about the check-in request to a log file, and the usage aggregation service instance may read the log file.

A usage aggregation service instance (e.g., usage aggregation service instance 120) may correlate check-out requests and check-in requests based on the information about the check-out request and the information about the check-in request. For example, a set of fields in the check-out request and the check-in request may be matched with one another. If the set of fields matches, then it may be determined that the check-in request correlates with the check-out request. Specifically, in some embodiments, a check-in request may correlate with a previously received check-out request if the values of the following fields in the two requests match each other (see FIG. 3 below): a job identifier corresponding to a job associated with the request, a process identifier corresponding to a process associated with the request (a single job may include multiple processes), an IP address associated with the request (e.g., the source IP address of the packet that contained the request), a feature identifier corresponding to the feature in the application that requires a license, and a user identifier corresponding to the application. For a given pair of check-out and check-in requests, the usage aggregation service instance (e.g., usage aggregation service instance 120) may determine a usage amount based on the timestamps of the check-out request and the corresponding check-in request. Specifically, the difference in the two timestamps (where the check-in timestamp is later than the check-out timestamp) corresponds to a time duration for which the license was used. The time duration may be multiplied by a usage cost per unit time to obtain the usage amount. In some embodiments, the usage amount may be in a currency unit. The cost per unit time may depend on multiple factors, which include, but are not limited to, (1) the feature identifier (different application features may have different usage costs), (2) the user identifier (different users or customers may have different usage costs), and (3) the IP address (different locations may have different usage costs). An overage rate may apply if the available usage credits is below a threshold value, and the overage rate may also depend on one or more factors.

The usage amount may be stored in usage database 110. Specifically, usage data 110 may associate the usage amount with information about the check-out request and the information about the check-in request. Usage report module 112 may generate reports by executing one or more queries on usage database 110. Notification module 114 may execute one or more queries on usage database 110 and generate one or more notifications when the query results satisfy a set of criteria. User 126 may access usage reports and/or notifications through portal 128, which may provide a user interface and may be implemented by a set of instructions executing on a processor. In general, any type of usage analytics may be generated and provided to user 126, which may include, but is not limited to, analysis of time series data on a per user, per application, or per project basis. In some embodiments, notification module 114 may send notifications to user 126 through an interface that is different from portal 128. For example, notification module 114 may send a text message or an email to a user.

Figure 1B:
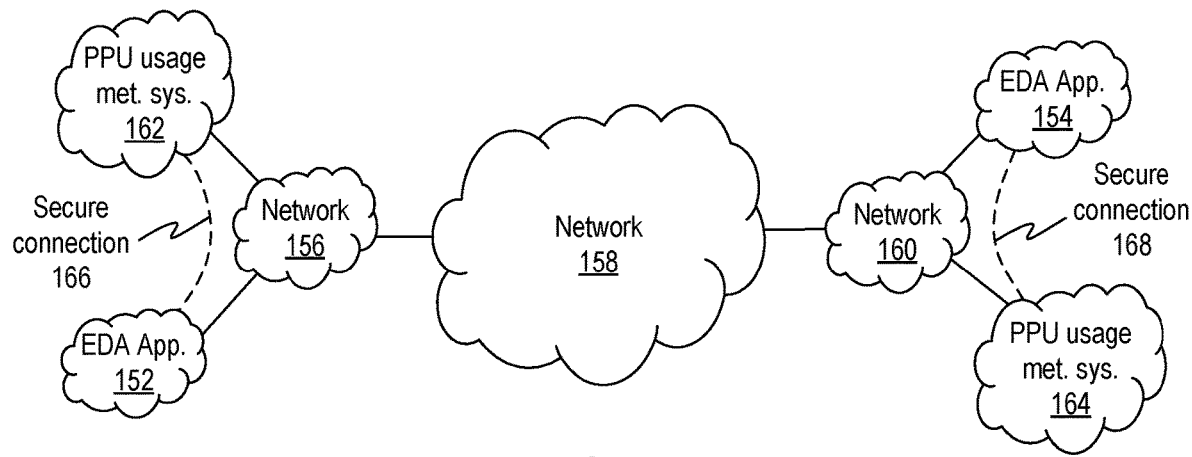
FIG. 1B illustrates using PPU metering system locations that are geographically close to cloud computing locations in accordance with some embodiments described herein.

FIG. 1B illustrates using PPU metering system locations that are geographically close to cloud computing locations in accordance with some embodiments described herein.

Cloud computing locations may be interconnected via a set of networks, e.g., network 156, network 158, and network 160. Networks 156, 158, and 160 may generally be any type of network. Examples of types of networks include, but are not limited to, local area networks and wide area networks. In some embodiments described herein, PPU metering systems may be hosted at cloud computing locations that are geographically close to the locations of the application. For example, PPU metering system 162 may be hosted at a cloud computing location that is geographically close to the first cloud computing location that hosts EDA application 152 and PPU metering system 164 may be hosted at a cloud computing location that is geographically close to the second cloud computing location that hosts EDA application 154.

A secure connection may be established between a cloud computing location that hosts an application and the same or another cloud computing location that hosts a corresponding PPU metering system. For example, secure connection 166 may be established between the first cloud computing location that hosts EDA application 152 and the cloud computing location that hosts PPU metering system 162. Communications (e.g., check-out requests and check-in requests) between EDA application 152 and PPU metering system 162 may be sent over secure connection 166. Likewise, secure connection 168 may be established between the second cloud computing location that hosts EDA application 154 and the cloud computing location that hosts PPU metering system 164. Communications (e.g., check-out requests and check-in requests) between EDA application 154 and PPU metering system 164 may be sent over secure connection 168.

In some embodiments described herein, for a given application that is hosted in a cloud computing location, a corresponding PPU metering system may be hosted in the same or a nearby cloud computing location that allows the PPU metering system to service check-in and check-out requests from the application in less than a threshold latency.

Figure 2:
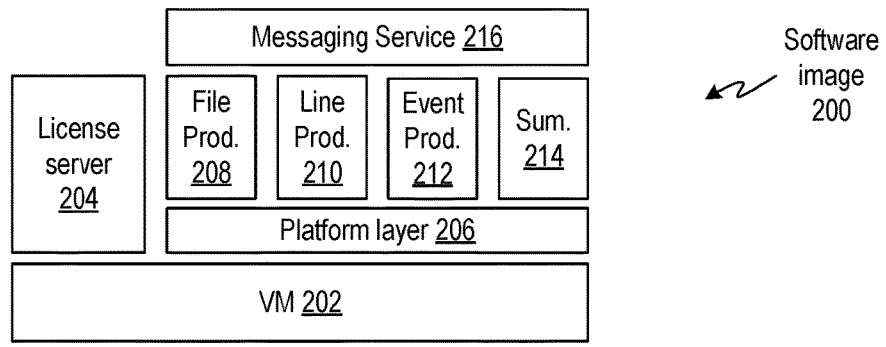
FIG. 2 illustrates a license server and a usage aggregation service instance in accordance with some embodiments described herein.

FIG. 2 illustrates a license server and a usage aggregation service instance in accordance with some embodiments described herein.

Software image 200 may include license server 204, which may execute on virtual machine (VM) 202. A usage aggregation service instance may be implemented using containers. A container may be a lightweight (i.e., containers use substantially less processor, memory, and network resources when compared to a VM), standalone, executable package of software that includes everything needed to run an application: code, runtime, system tools, system libraries, and settings. Platform layer 206 may be implemented on top of VM 202 and provide a runtime environment in which one or more containers can execute. In some embodiments described herein, the functionality of a usage aggregation service instance may be implemented using one or more containers. For example, the following containers may be used in some embodiments: file producer 208, line producer 210, event producer 212, and summarizer 214. Containers may communicate with each other via messaging service 216.

In some embodiments, license server 204 may store information about check-in requests and check-out requests in a log file. File producer 208 may monitor new or updated log files and publish a handle to the log files to messaging service 216 when a new or updated log file is detected. Line producer 210 may read the log files published by file producer 208, order the lines in the log files based on the timestamps of the lines, and publish the ordered lines to messaging service 216. Event producer 212 may read the lines published by line producer 210, parse the lines to extract fields in the lines, identify check-out and check-in events, create objects for the identified check-out and check-in events, and publish the objects to messaging queue. Summarizer 214 may read the objects published by event producer 212, correlate the check-out and check-in objects, calculate the usage amount, and store the usage amount in a usage database (e.g., usage database 110).

In some embodiments, additional instances of a VM executing software image 200 may be created when a PPU metering system needs to scale-up. For example, autoscaling service 108 in FIG. 1 may spawn a new instance of a VM executing software image 200, which may create an additional pair of a license server and a usage aggregation service instance.

Figure 3:
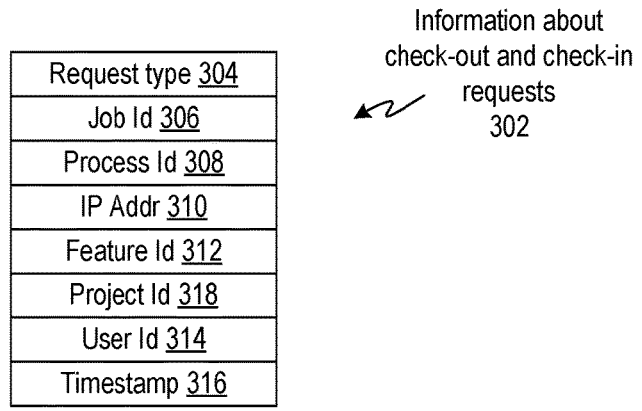
FIG. 3 illustrates information about check-out and check-in requests in accordance with some embodiments described herein.

FIG. 3 illustrates information about check-out and check-in requests in accordance with some embodiments described herein.

Information about check-out and check-in requests 302 may be stored by a license server (e.g., license server 116) when the license server processes a check-out or check-in request. For example, a license server may write the information to a log file. Information about check-out and check-in requests 302 may include one or more system or application parameters. In general, information about check-out and check-in requests 302 may uniquely identify a licensing unit that is managed by the licensed server and that may be checked-out or checked-in. For example, information about check-out and check-in requests 302 may include, but is not limited to, one or more of the following fields: (1) request type field 304 that indicates whether the request is a check-out request or a check-in request, (2) job identifier 306 corresponding to a job associated with the request, (3) process identifier 308 corresponding to a process associated with the request (a single job may include multiple processes), (4) Internet Protocol (IP) address 310 associated with the request (e.g., the source IP address of the packet that contained the request), (5) feature identifier 312 corresponding to the feature in the application that requires a license, (6) project identifier 318 corresponding to the executing instance of the application, (7) user identifier 314 corresponding to the application, and (8) timestamp 316 corresponding to the request (e.g., the timestamp when the license server received the request).

Figure 4:
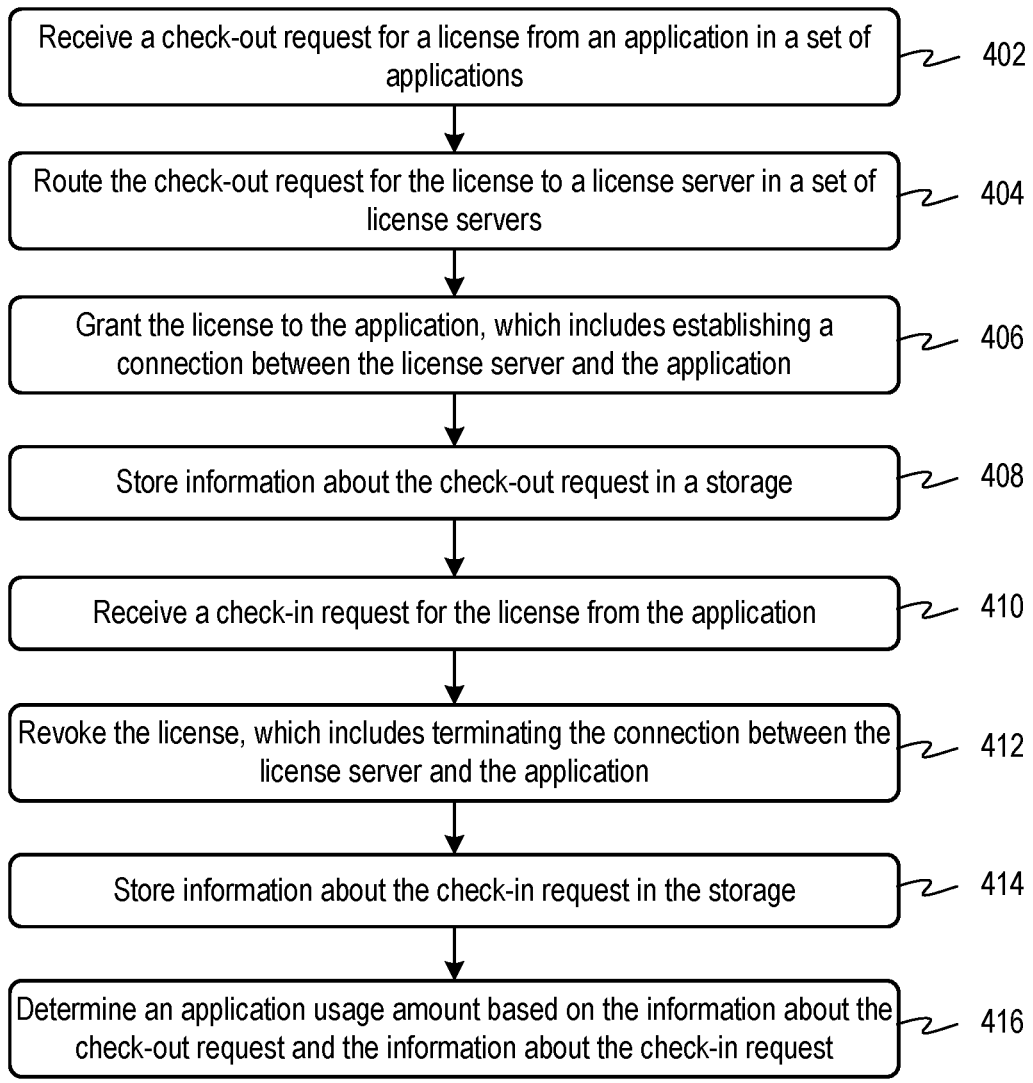
FIG. 4 illustrates a process for implementing PPU metering service in accordance with some embodiments described herein.

FIG. 4 illustrates a process for implementing PPU metering service in accordance with some embodiments described herein.

A check-out request for a license may be received from an application in a set of applications (at 402). For example, in FIG. 1, PPU metering system 102 may receive a check-out request for a license from EDA application 124. In some embodiments, the set of applications and the PPU metering system may be co-located in the same cloud computing service location. In some embodiments, the set of applications may execute in a first set of cloud computing locations, and the PPU metering system (which includes a set of license servers) may execute in a second set of cloud computing locations. In these embodiments, the second cloud computing location may be selected to be geographically close to the first cloud computing location. A secure connection may be established between the cloud computing location that hosts the applications and the cloud computing location that hosts the PPU metering system so that check-out and check-in requests may be routed securely over the connection.

Next, the check-out request for the license may be routed to a license server in a set of license servers (at 404). For example, in FIG. 1, load balancer 104 may route the check-out request to license server 116. The license may then be granted to the application, which may include establishing a connection between the license server and the application (at 406). For example, in FIG. 1, EDA application 124 may establish a connection (e.g., a TCP/IP connection) with license server 116, which may grant the license to EDA application 124. Next, information about the check-out request may be stored in a storage, e.g., in a disk (at 408). For example, in FIG. 1, license server 116 may write the information about the check-out request to a log file. As shown in FIG. 3, the information about the check-out request may include one or more of a request type field, a job identifier corresponding to the application, a process identifier corresponding to the application, an IP address corresponding to the application, a feature identifier corresponding to the application, a project identifier corresponding to the executing instance of the application, a user identifier corresponding to the application, and a first timestamp corresponding to the check-out request.

A check-in request may then be received for the license from the application (at 410). Next, the license may be revoked, which may include terminating the connection between the license server and the application (at 412). For example, in FIG. 1, license server 116 may receive a check-in request for the license from EDA application 124, and license server 116 may revoke the license, which may include terminating the connection between license server 116 and EDA application 124. Information about the check-in request may be stored in the storage, e.g., in the disk (at 414). For example, in FIG. 1, license server 116 may write the information about the check-in request to a log file. As shown in FIG. 3, the information about the check-in request may include one or more of a request type field, a job identifier corresponding to the application, a process identifier corresponding to the application, an IP address corresponding to the application, a feature identifier corresponding to the application, a project identifier corresponding to the executing instance of the application, a user identifier corresponding to the application, and a first timestamp corresponding to the check-out request.

Next, a usage amount may be determined based on the information about the check-out request and the information about the corresponding check-in request (at 416). Specifically, the check-out requests and the check-in requests may be correlated based on one or more of the request type field, the job identifier corresponding to the application, the process identifier corresponding to the application, the IP address corresponding to the application, the feature identifier corresponding to the application, the project identifier corresponding to the executing instance of the application, and the user identifier corresponding to the application. The check-out requests and check-in requests have an associated timestamp (e.g., timestamp 316 shown in FIG. 3). When a check-out request (which includes a first timestamp) correlates with a check-in request (which includes a second timestamp), the usage amount may be determined based on a difference between the second timestamp and the first timestamp. For example, in FIG. 2, file producer 208, line producer 210, event producer 212, and summarizer 214 may be used to determine the usage amount by correlating check-out requests and check-in requests.

Figure 5:
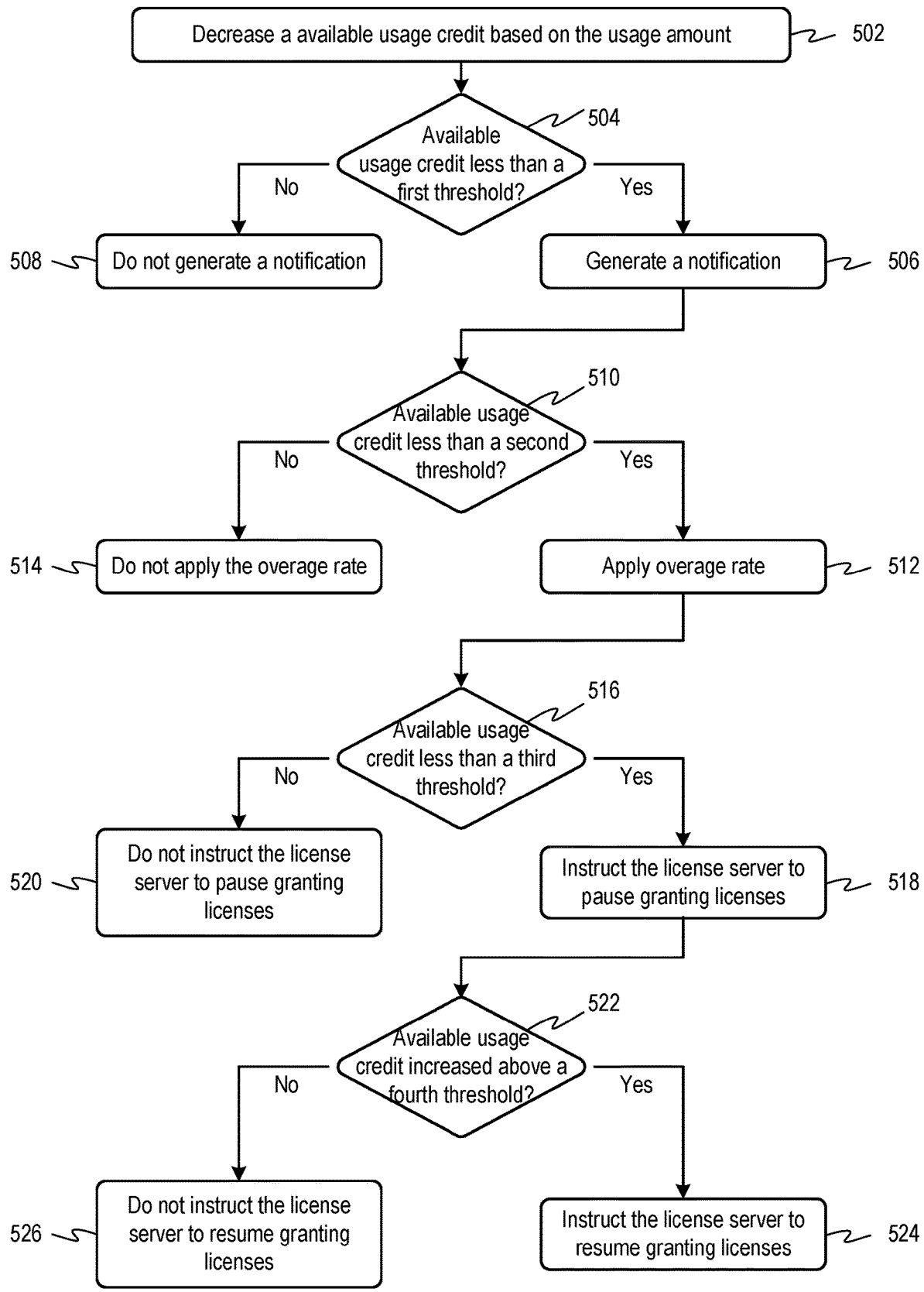
FIG. 5 illustrates a process for updating usage credit and taking desired actions based on usage credit in accordance with some embodiments described herein.

FIG. 5 illustrates a process for updating available usage credit and taking desired actions based on usage credit in accordance with some embodiments described herein.

Initially, a customer may buy a certain amount of usage credit from a software vendor. The available usage credit may be updated as the customer uses a licensed software application and/or buys additional usage credit. Specifically, the available usage credit may be decreased based on the usage amount (at 502). The usage amount is determined as described with respect to FIG. 4, according to one embodiment. Next, the available usage credit may be compared with a first threshold (at 504). If the available usage credit is less than the first threshold ("Yes" branch), then a notification may be generated (at 506) and sent to one or more users. On the other hand, if the available usage credit is not less than the first threshold ("No" branch), then no notification may be generated (at 508). For example, in FIG. 1, notification module 114 may generate a notification if the available usage credit is below the first threshold.

The available usage credit may then be compared with a second threshold (at 510). If the available usage credit is less than the second threshold ("Yes" branch), then an overage rate may be applied (at 512) and optionally a notification may be generated and sent to one or more users. The overage rate may be a higher rate than a normal rate. In some embodiments, the overage rate may be specified as a percentage (e.g., 115%) of a normal rate. On the other hand, if the available usage credit is not less than the second threshold ("No" branch), then the overage rate may not be applied (at 514), i.e., a normal rate may be applied, and no notification may be generated and sent.

The available usage credit may then be compared with a third threshold (at 516). If the available usage credit is less than the third threshold ("Yes" branch), then the license server may be instructed to pause granting licenses (at 518) and optionally a notification may be generated and sent to one or more users. On the other hand, if the available usage credit is not less than the third threshold ("No" branch), then the license server may not be instructed to pause granting licenses (at 520) and no notification may be generated and sent. For example, in FIG. 1, usage aggregation service instance 120 may instruct license server 116 to pause granting licenses if the available usage credit is less than the third threshold.

Next, the available usage credit may be compared with a fourth threshold (at 522). If the usage credit has increased above the fourth threshold ("Yes" branch), then the license server may be instructed to resume granting licenses (at 524) and optionally a notification may be generated and sent to one or more users. On the other hand, if the available usage credit has not increased above the fourth threshold ("No" branch), then the license server may not be instructed to resume granting licenses (at 526) and no notification may be generated and sent. For example, in FIG. 1A, usage aggregation service instance 120 may instruct license server 116 to resume granting licenses if the available usage credit increased above the fourth threshold (e.g., because the customer bought additional usage credit). Steps 504, 510, 516 and 522 in FIG. 5 may be completed in any order, without deviating from the scope of the present disclosure.

Figure 6:
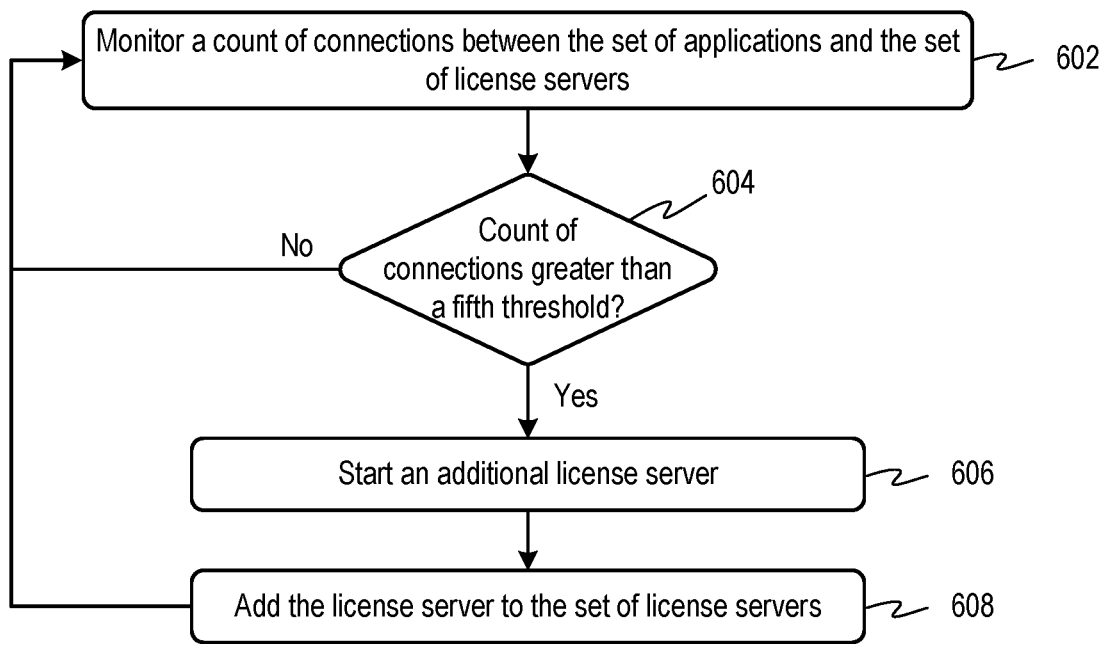
FIG. 6 illustrates a process for dynamically increasing the set of license servers in accordance with some embodiments described herein.

FIG. 6 illustrates a process for dynamically increasing the set of license servers in accordance with some embodiments described herein.

A count of concurrent connections between the set of applications and the set of license servers may be monitored (at 602). For example, in FIG. 1A, autoscaling service 108 may poll load balancer 104 to determine the count of concurrent connections between the set of applications and the set of license servers.

Next, the count of connections may be compared with a fifth threshold (at 604). If the count of connections is greater than the fifth threshold, then an additional license server may be started (at 606), the additional license server may be added to the set of license servers (at 608), and the process may return to 602. For example, if autoscaling service 108 determines that the count of connections is greater than the fifth threshold, then autoscaling service 108 may spawn an additional VM that is executing a license server and usage aggregation service instance (e.g., by spawning software image 200 shown in FIG. 2) and instruct load balancer 104 to add the newly spawned license server to the pool of license servers. On the other hand, if the count of connections is not greater than the fifth threshold, then the process may return to 602.

Figure 7:
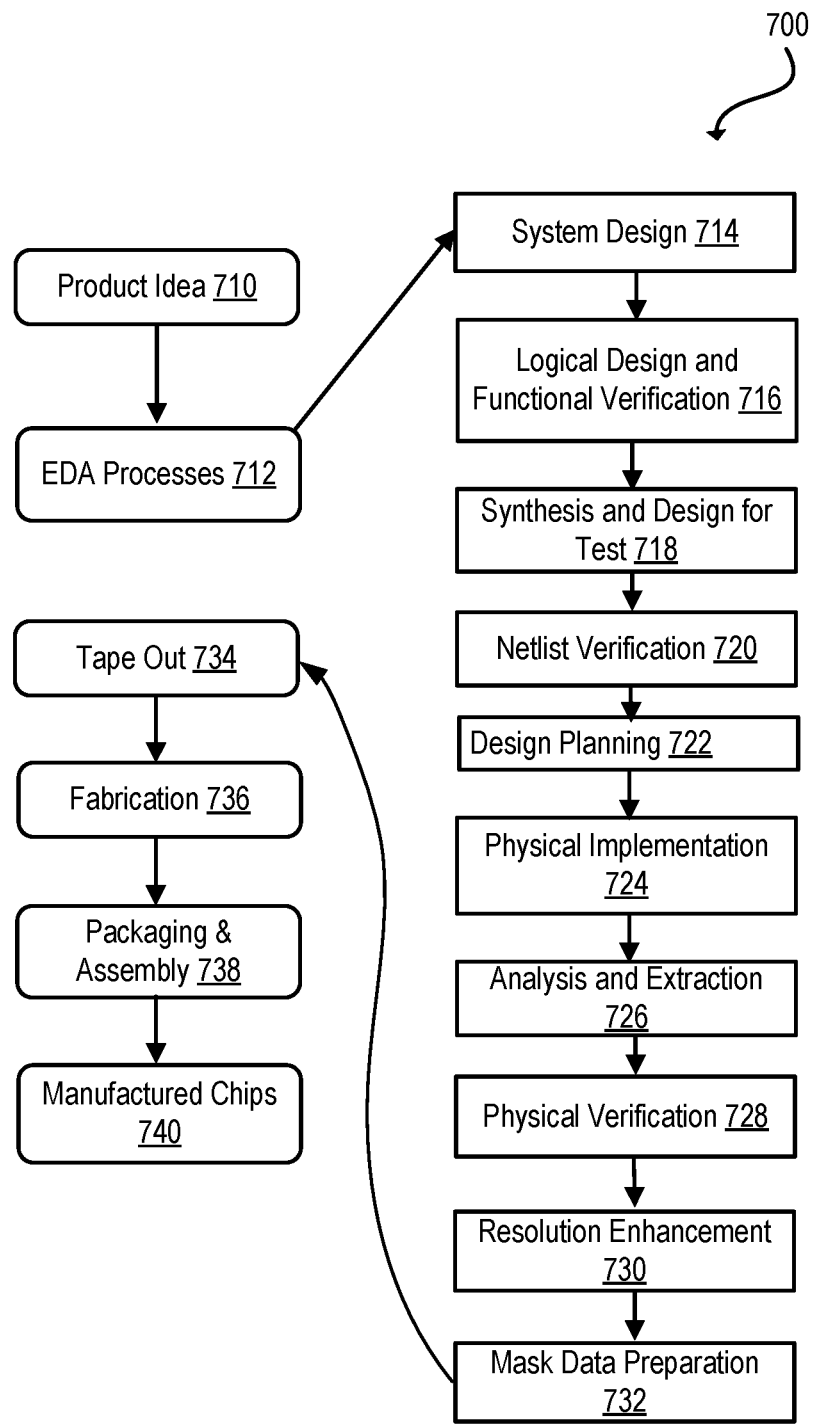
FIG. 7 illustrates an example flow for the design, verification, and fabrication of an integrated circuit in accordance with some embodiments described herein.

FIG. 7 illustrates an example flow 700 for the design, verification, and fabrication of an integrated circuit in accordance with some embodiments described herein. EDA processes 712 (the acronym "EDA" refers to "Electronic Design Automation") can be used to transform and verify design data and instructions that represent the integrated circuit. Each of these processes can be structured and enabled as multiple modules or operations. Each module or operation may require one or more licenses to operate.

Flow 700 can start with the creation of a product idea 710 with information supplied by a designer, information which is transformed and verified by using EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly 738 are performed to produce the manufactured IC chip 740.

Specifications for a circuit or electronic structure may range from low-level transistor material layouts to high-level description languages. A high-level of representation may be used to design circuits and systems, using a hardware description language ("HDL") such as VHDL, Verilog, System Verilog, SystemC, MyHDL or OpenVera. The HDL description can be transformed to a logic-level register transfer level ("RTL") description, a gate-level description, a layout-level description, or a mask-level description. Each lower representation level that is a more concrete description adds more detail into the design description. The lower levels of representation that are more concrete descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
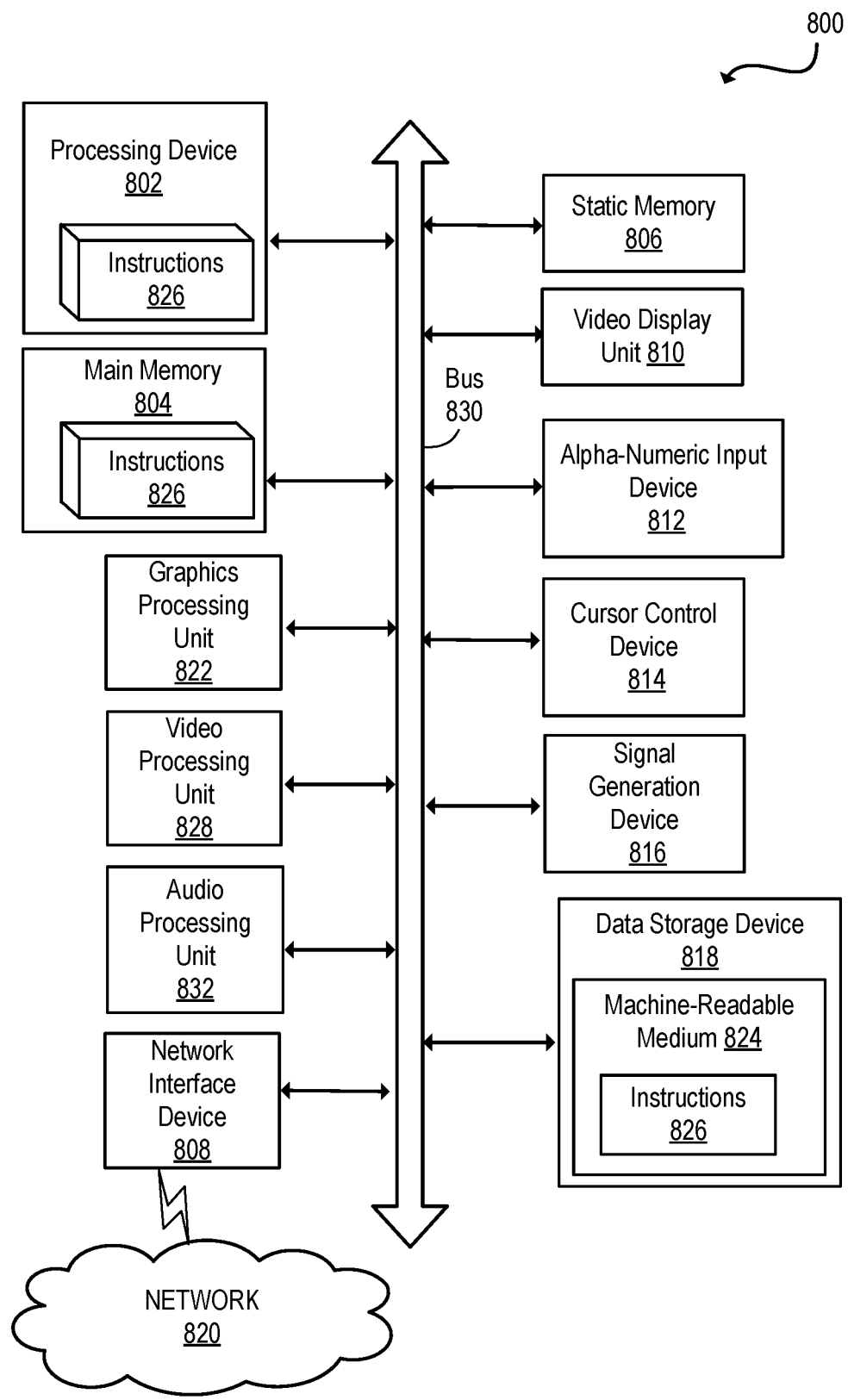
FIG. 8 illustrates an example machine of a computer system within which a set of instructions, for causing the machine to perform any one or more of the methodologies discussed herein, may be executed.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    receiving a check-out request for a license from an application in a set of applications;
    routing the check-out request for the license to a license server in a set of license servers;
    granting the license to the application, wherein the granting the license to the application comprises establishing a connection between the license server and the application, wherein the connection is a bi-directional transport layer connection which remains open until the license is revoked;
    storing first information about the check-out request in a storage;
    receiving a check-in request for the license from the application;
    revoking the license, wherein the revoking the license comprises terminating the connection between the license server and the application;
    storing second information about the check-in request in the storage; and
    determining, by a processor, a usage amount based on the first information about the check-out request and the second information about the check-in request.

2. The method of claim 1, further comprising decreasing an available usage credit based on the usage amount.

3. The method of claim 2, further comprising:
    comparing the available usage credit with a first threshold; and
    generating a notification if the available usage credit is below the first threshold.

4. The method of claim 2, further comprising:
    comparing the available usage credit with a second threshold; and
    applying an overage rate if the available usage credit is below the second threshold.

5. The method of claim 2, further comprising:
    comparing the available usage credit with a third threshold; and
    instructing the license server to pause granting licenses if the available usage credit is below the third threshold.

6. The method of claim 5, further comprising instructing the license server to resume granting licenses if the available usage credit increases above a fourth threshold.

7. The method of claim 1, further comprising generating a usage report based on the usage amount.

8. The method of claim 1, further comprising:
    monitoring a count of connections between the set of applications and the set of license servers;

comparing the count of connections with a fifth threshold; and responsive to determining that the count of connections is greater than the fifth threshold,
starting a first license server, and
adding the first license server to the set of license servers.

9. The method of claim 1, wherein the first information about the check-out request includes one or more of a request type field, a job identifier corresponding to the application, a process identifier corresponding to the application, an Internet Protocol (IP) address corresponding to the application, a feature identifier corresponding to the application, a project identifier corresponding to the application, a user identifier corresponding to the application, and a first timestamp corresponding to the check-out request.

10. The method of claim 9, wherein the second information about the check-in request includes one or more of the request type field, the job identifier corresponding to the application, the process identifier corresponding to the application, the IP address corresponding to the application, the feature identifier corresponding to the application, the project identifier corresponding to the application, the user identifier corresponding to the application, and a second timestamp corresponding to the check-in request.

11. The method of claim 10, wherein the determining the usage amount based on the first information about the check-out request and the second information about the check-in request comprises:
correlating the check-out request with the check-in request based on one or more of the job identifier corresponding to the application, the process identifier corresponding to the application, the IP address corresponding to the application, the feature identifier corresponding to the application, the project identifier corresponding to the application, and the user identifier corresponding to the application; and
in response to determining that the check-out request correlates with the check-in request, determining the usage amount based on a difference between the second timestamp and the first timestamp.

12. The method of claim 1, wherein the set of applications executes in a first set of cloud computing locations, and wherein the set of license servers executes in a second set of cloud computing locations.

13. The method of claim 12, further comprising:
selecting a second cloud computing location in the second set of cloud computing locations that is geographically close to a first cloud computing location in the first set of cloud computing locations; and
establishing a secure connection between the first cloud computing location and the second cloud computing location to route check-out and check-in requests.

14. A non-transitory computer readable storage medium storing instructions, which when executed by a processor, cause the processor to:
receive a check-out request for a license from an application in a set of applications;
route the check-out request for the license to a license server in a set of license servers;
grant the license to the application, wherein the granting the license to the application comprises establishing a connection between the license server and the application;
receive a check-in request for the license from the application;
revoke the license, wherein the revoking the license comprises terminating the connection between the license server and the application;
determine a usage amount based on information about the check-out request and information about the check-in request;
decrease an available usage credit based on the usage amount; and
instruct the license server to pause granting licenses if the available usage credit is below a first threshold.

15. The non-transitory computer readable storage medium of claim 14, further comprising instructing the license server to resume granting licenses if the available usage credit increases above a second threshold.

16. The non-transitory computer readable storage medium of claim 14, further comprising:
monitoring a count of connections between the set of applications and the set of license servers;
comparing the count of connections with a third threshold; and
responsive to determining that the count of connections is greater than the third threshold,
starting a first license server, and
adding the first license server to the set of license servers.

17. The non-transitory computer readable storage medium of claim 14, wherein the determining the usage amount based on the information about the check-out request and the information about the check-in request comprises:
correlating the check-out request with the check-in request based on a job identifier corresponding to the application, a process identifier corresponding to the application, an Internet Protocol (IP) address corresponding to the application, a feature identifier corresponding to the application, a project identifier corresponding to the application, and a user identifier corresponding to the application; and
in response to determining that the check-out request correlates with the check-in request, determining the usage amount based on a difference between a second timestamp corresponding to the check-in request and a first timestamp corresponding to the check-out request.

18. An apparatus, comprising:
a memory storing instructions; and
a processor, coupled with the memory and to execute the instructions, the instructions when executed causing the processor to:
monitor a count of connections between a set of applications and a set of license servers;
responsive to determining that the count of connections is greater than a first threshold, start a first license server and add the first license server to the set of license servers, wherein starting the first license server includes spawning a software image which includes the first license server;
receive a check-out request for a license from an application in the set of applications;
grant the license to the application, wherein the granting the license to the application comprises establishing a connection between a second license server in a set of license servers and the application;
receive a check-in request for the license from the application;
revoke the license, wherein the revoking the license comprises terminating the connection between the second license server and the application; and determine a usage amount based on a difference between a second timestamp corresponding to the check-in request and a first timestamp corresponding to the check-out request.

19. The apparatus of claim 18, wherein the instructions when executed causing the processor to decrease an available usage credit based on the usage amount.

20. The apparatus of claim 19, wherein the instructions when executed causing the processor to:

compare the available usage credit with a first threshold; and generate a notification if the available usage credit is below the first threshold.

\* \* \* \* \*